United States Patent
Breitegger et al.

(10) Patent No.: US 6,827,063 B2
(45) Date of Patent: Dec. 7, 2004

(54) METHOD AND DEVICE FOR ESTABLISHMENT OF A SIGNAL PATTERN BASED ON CRANK ANGLE OF INTERNAL COMBUSTION ENGINE

(75) Inventors: Bernhard Breitegger, Lieboch (AT); Eduard Unger, Leibnitz (AT); Christian Roduner, Graz (AT); Alois Fürhapter, Graz (AT)

(73) Assignee: AVL List GmbH, Graz (AT)

( * ) Notice: Subject to any disclaimer, the term of this patent is extended or adjusted under 35 U.S.C. 154(b) by 99 days.

(21) Appl. No.: 10/224,404

(22) Filed: Aug. 21, 2002

(65) Prior Publication Data

US 2003/0037767 A1 Feb. 27, 2003

(30) Foreign Application Priority Data

Aug. 22, 2001 (AT) ..................... GM656/2001

(51) Int. Cl.[7] .................. F02P 5/153; F02D 41/00
(52) U.S. Cl. ............... 123/406.58; 123/406.41; 123/406.6; 123/612
(58) Field of Search .......... 123/406.17, 406.18, 123/406.22, 406.24, 406.58, 406.41, 406.6, 406.65, 612; 73/117.2, 117.3

(56) References Cited

U.S. PATENT DOCUMENTS

| | | | | |
|---|---|---|---|---|
| 4,111,041 A | * | 9/1978 | Rice | 73/115 |
| 4,321,580 A | * | 3/1982 | Deleris | 340/870.24 |
| 4,553,426 A | * | 11/1985 | Capurka | 73/116 |
| 5,229,945 A | * | 7/1993 | Demizu et al. | 701/102 |
| 5,497,748 A | * | 3/1996 | Ott et al. | 123/406.6 |
| 5,505,077 A | * | 4/1996 | Fukui et al. | 73/115 |
| 5,559,705 A | * | 9/1996 | McClish et al. | 701/110 |
| 5,703,283 A | * | 12/1997 | McClish et al. | 73/116 |
| 5,765,530 A | * | 6/1998 | Machida et al. | 123/406.43 |
| 5,864,775 A | * | 1/1999 | Bradshaw et al. | 702/104 |
| 6,034,525 A | * | 3/2000 | Koerner et al. | 324/165 |
| 6,119,666 A | * | 9/2000 | Fischer et al. | 123/617 |
| 6,229,302 B1 | * | 5/2001 | Varady et al. | 324/207.25 |
| 6,609,497 B2 | * | 8/2003 | Daniels | 123/406.43 |
| 6,644,273 B1 | * | 11/2003 | Hagari et al. | 123/406.18 |
| 2002/0170346 A1 | * | 11/2002 | Shimoyama | 73/118.2 |
| 2003/0037607 A1 | * | 2/2003 | Minich et al. | 73/117.3 |
| 2003/0114939 A1 | * | 6/2003 | Hansen et al. | 700/7 |
| 2003/0216853 A1 | * | 11/2003 | Jacobson | 701/106 |

FOREIGN PATENT DOCUMENTS

| | | |
|---|---|---|
| DE | 3721010 | 1/1988 |
| DE | 3721162 | 1/1988 |
| DE | 19814732 | 10/1999 |
| WO | 0140643 | 6/2001 |

* cited by examiner

*Primary Examiner*—Hai Huynh
(74) *Attorney, Agent, or Firm*—Dykema Gossett PLLC

(57) ABSTRACT

For the establishment of a crank-angle based signal pattern with high discrimination representing a relevant working characteristic of an internal combustion engine, the working characteristic is detected with high time discrimination and with the aid of a time-based and angled-based crank-angle signal of low angle discrimination and transformed to a crank-angle basis under interpolation, and whereby there is assigned to the top dead center (OT) of the respective cylinder, by a multiple, a freely selectable angle increment under interpolation with high angle discrimination.

11 Claims, 2 Drawing Sheets

METHOD AND DEVICE FOR ESTABLISHMENT OF A SIGNAL PATTERN BASED ON CRANK ANGLE OF INTERNAL COMBUSTION ENGINE

BACKGROUND OF THE INVENTION

1. Field of the Invention

The invention relates to a method for establishment of working characteristics relevant to the operation of an internal combustion engine, especially an internal combustion engine installed in a vehicle, and in particular, the signal pattern based on the crank angle representing the combustion chamber pressure. The invention also related to a device to execute this method.

2. The Prior Art

Such methods and devices, as well as the execution of these methods, are known in the art and they communicate currently with an angle reference-wheel arranged most often on a crankshaft or a camshaft rotatably joined thereto, whereby the angle reference positions arranged in a specific angular pitch are scanned by a respective sensor and processed correspondingly in an evaluation unit. There are special angle-reference triggers used in the area of engine research and development, which make possible a very accurate triggering of the used index measuring system up to the range of 0.1° to 0.5° crank angle (KW), but which is complicated and costly and not usable in vehicles (for on-board engine control). On the other hand, there are currently used the so-called crankshaft trigger wheels with the common 6° circular pitch in teeth for various applications of internal combustion engines, which are installed as drive engines in vehicles, whereby two teeth are missing to make possible an absolute angle assignment (60−2=trigger wheel). Signal detection with high crank-angle discrimination in real-time and with little time delay is thereby not possible, and for this reason, the precise methods and devices widely and commonly used in the index measuring technology cannot be employed.

It is the object of the present invention to avoid the aforementioned disadvantages of methods and devices known in the art and to provide particularly a possibility to make use of the precise methods and devices known from the index measuring system with simple, cost-effective crank-angle trigger wheels that are suitable for vehicles as well.

SUMMARY OF THE INVENTION

This object is achieved according to the present invention with a method of the aforementioned type in that the working characteristic is measured time-based with high time discrimination and which is transformed to a crank angle basis with the aid of a time and angle-based crank-angle signal of low angle discrimination under interpolation, and whereby there is assigned to the top dead center (OT) of the respective cylinder, by a multiple, a freely selectable angle increment under interpolation with high angle discrimination. The time-equidistant received sensor signal of the monitored working characteristic can thus be transformed, in a simple way, into an angle-equidistant signal whereby the actually resulting "transformation ratio" is arbitrary to a large extent.

According to an especially preferred embodiment of the inventive method, the transformation is performed based on the crank angle under consideration of rpm- and/or angle-dependent correction values, which are preferably obtained under defined load conditions without the rpm-fluctuations caused by the [vehicle] operation, e.g., in an engine trailing throttle state, especially under the use of the symmetric pressure pattern during engine trailing throttle state at open throttle, whereby the angle of the maximum cylinder pressure (detected by intersection method) to the top center (OT) of the engine has a rpm-dependent offset value, which is used for correction. Time values can be determined from the time information of the signal flanks of the crankshaft trigger-wheel sensor (signal flanks cause an interrupt routine in which the actual timer value is placed in intermediate storage) and of the time information of the working characteristics signal (scanned before, between and after said flanks), and under consideration of correction values, e.g., rpm- and angle dependent correction characteristic, whereby said time characteristics are strictly assigned to the top dead center of the respective cylinder (and not the signal flanks of the trigger wheel) by a multiple—e.g. 0.5° crank angle—of a freely selectable angle increment. Precision can be achieved, particularly in reference to angle-offset errors, with the use of correction values, which are given automatically in defined load conditions, as in the above-mentioned engine trailing throttle state, and which offer results comparable to the above-mentioned precise bench test indexing.

In an especially preferred embodiment of the invention, a cylinder pressure curve in the range up to the start of combustion of the respective cylinder, determined by thermodynamic calculation methods, is compared to an actual cylinder pressure curve, which is determined in turn by means of a pressure sensor, whereby the respective absolute crankshaft angle is computed with a discrimination in the range of an approximately 1° crank angle (KW). Thus, it is possible, for example, to use a (toothed) trigger wheel on the crankshaft without synchronization elements (the above-mentioned missing two teeth for determination of the absolute angle position), which makes manufacturing of the trigger wheel easier, on one hand, and which increases, on the other hand, the angle information at the position of the otherwise provided gap (6° instead of 18° flank width). Additionally, this embodiment makes directly possible the use of the flywheel ring gear of the internal combustion engine as a trigger wheel in many applications.

At this point it must be mentioned that the invention is not limited, of course, to the above-mentioned example having the combustion chamber pressure as a relevant working characteristic. The determination of the highly discriminated position of a reference signal relative to the crankshaft angle, made possible by the invention, is additionally of great advantage practically at all synchronous crankshaft-influenced values, which are determined by sensors at the corresponding positions in the motor areas, such as the suction pressure, the exhaust pressure, the air mass flow, the measured values from vibration sensors and knocking sensors, and the like.

According to an especially preferred additional embodiment of the invention, the interpolation is performed in a linear manner through implemented functions, whereby the time for calculations is saved and a very small shift in time can be achieved. The resulting shift in time is thereby determined essentially only by the number of teeth on the trigger wheel or by the time span between consecutive trigger signals.

The time-based pick-up of the working characteristic occurs in further embodiments of the invention with a discrimination dependent on the dynamics, preferably in the range of approximately 10 to 50 microseconds. Crank-angle-based discrimination can be achieved thereby—as already mentioned above—which allows the use of methods and devices known from the indexing technology.

Mounting errors of the trigger wheel and sensor can be continuously corrected during operation on a crank angle basis during transformation and interpolation of the time-based, recorded working characteristic. By mounting error there is to be understood the angle shift between one parameter value strictly predetermined for all vehicles of one series (e.g., the position of the first tooth of the trigger wheel after the gap relative to the top dead center of a cylinder of the engine) and the true angle-offset value based on the tolerance during manufacturing and installation of the trigger wheel together with the transfer behavior of the respective position sensors (transformation of the changing magnetic field based on the trigger wheel into the sensor output signal and zero-passage signal detection).

An inventive device for carrying out the described method is provided with a timely and highly discriminating sensor for the relevant working characteristic, a crank angle sensor of low discrimination (standard crank angle sensor), which is preferably a trigger wheel on the crankshaft having 60 minus 2 teeth together with the respective pick-up sensor, and a transformation- and interpolation element being in communication with the working characteristic sensor and the crank angle sensor, whereby said transformation—and interpolation element establishes the highly discriminating signal pattern of the working characteristic. This makes possible a simple and compact arrangement, which may be easily mounted in a vehicle for which the internal combustion engine is installed as drive.

According to the preferred embodiment of the invention, the transformation- and/or interpolation element may be integrated either in the motor control of the internal combustion engine or in a micro-electric unit that is preferably housed in one of the measuring amplifiers, in one of the connectors, or in one of the sensors itself, which further simplifies the arrangement in a vehicle.

The invention will now be described in more detail with the aid of accompanying drawings.

DETAILED DESCRIPTION OF THE PREFERRED EMBODIMENT

Figure 1:
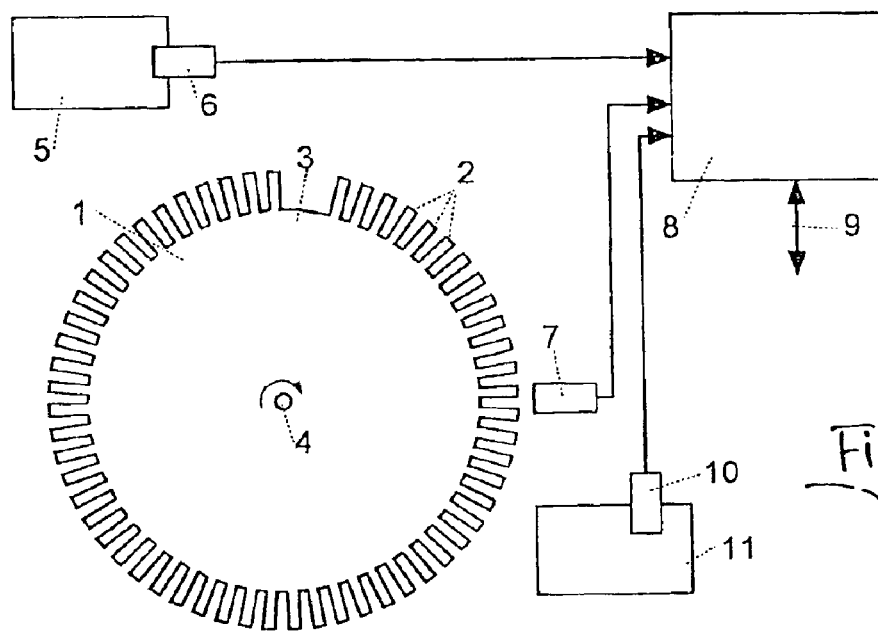
FIG. 1 shows a schematic illustration of a device according to the invention.

FIG. 1 shows, for example, the component relevant for the cylinder pressure evaluation in the example of a single-cylinder engine. The gas pressure is measured by means of a sensor 6 in the internal combustion chamber/cylinder 5 and the data is forwarded to the evaluation unit 8. The sensor output signal is amplified according to the respective sensor 6 (not shown here). The teeth 2 of a crankshaft trigger wheel 1 affixed to the crankshaft 4 of the engine are scanned by means of a position sensor (pick-up sensor) 7 and the data is forwarded to the evaluation unit 8 as well, whereby the sampling instants of the over- and under-travel of defined threshold values may be used for the determination of position. Sensing devices are used for the position sensor 7, which are based on inductive, capacitive or optic measuring principles. A width defined by gap 3 (e.g., two missing teeth), or even an additional tooth, serves for detection of the absolute angle position of the crankshaft. Sensors 10 may additionally be attached at other positions 11 in the engine area, e.g., suction pipe, whose signals are to be acquired in the crank angle base (diagram). In addition, a suction pipe- or exhaust gas-pressure sensor is used for offset calibration through signal comparison at corresponding crank angle during the use of a capacitive cylinder-pressure sensor. The establishment of the signal entered in the crank-angle base and/or the parameter calculated thereof, as well as the data exchange needed for calculation, occurs via data intersection 9, e.g., a controller area network (CAN)—(Sensor comparison values for the offset calibration may also be detected by an overriding control device and said values may be transmitted therewith). The output via intersection 9 may also occur as a voltage signal, a frequency signal, or a pulse-width modulation (PWM) signal, and it may be multiplexed in the output of a plurality of values.

A way of Detection of the Angle-equidistant Signal Pattern

Figure 2A:
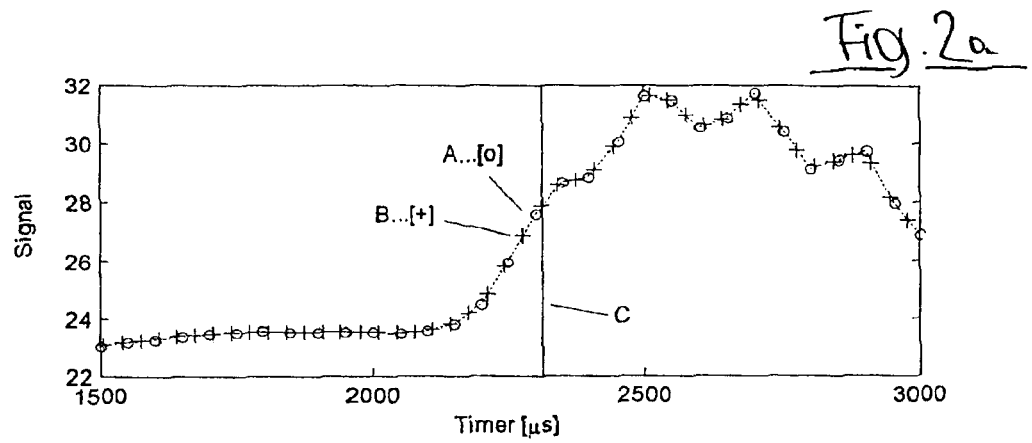
Figure 2B:
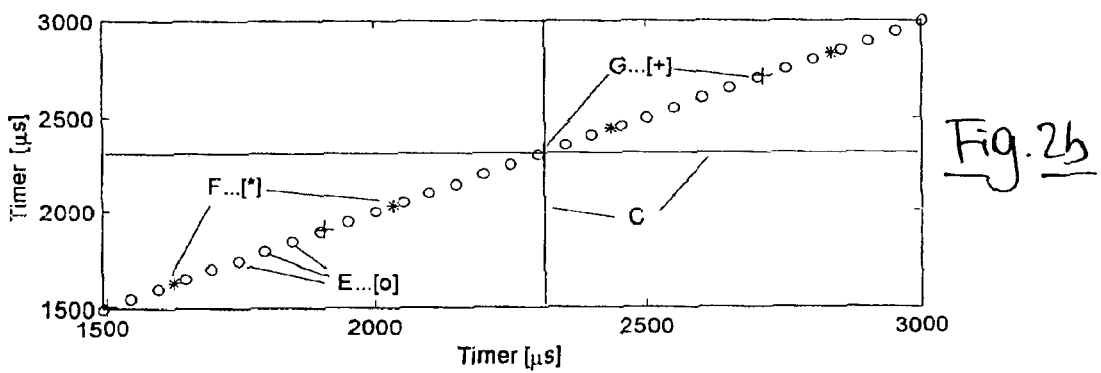
Figure 2C:
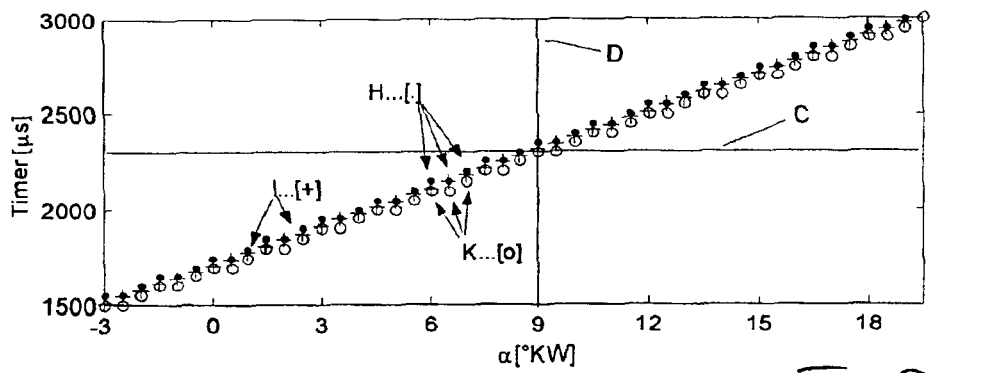

Signal A in FIG. 2a marked with [o] corresponds to the cylinder-pressure signal in the time base measured with the pressure sensor 6. The measured time values are entered in microseconds on the x-axis as they relate to individual measuring points and in FIG. 2b they are also marked with [o] being time values E. Since the respective time value (used in interpolation) is recorded together with each scanned value, time-equidistant scanning in not necessarily required. Signal B marked with [+] in FIG. 2a is the computed angle-equidistant signal. Correspondingly computed time values are again entered on the x-axis, which are shown in FIG. 2c as computed (not measured) time values I, and they are marked with as well. The two steps, being the determination of time values corresponding to the angle base and signal interpolation, are essentially necessary in the computation of signal B.

Figure 3:
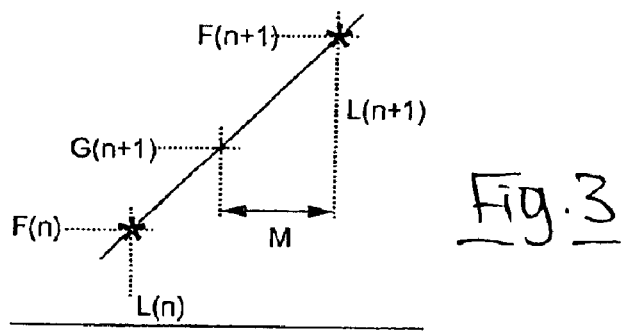
FIGS. 2a, 2b, 2c, 3 and 4 show schematic diagrams to explain the method according to the invention.

In the center diagram (FIG. 2b), the corresponding time values of the three bases (one time base and two angle bases) are displayed in x-direction and in y-direction, which results in a straight line having an inclination 1. The values of E—marked with [o]—are the measured time values of the time-synchronous signal scanning (time base), as previously illustrated. The values F, marked with [*], correspond to the time values that were measured during the interrupts triggered by the signal flanks (falling above/under a threshold value) of the trigger wheel (angle base 1). Subsequently, an angle-offset correction value M is calculated for the angle base 1 (see FIG. 3), so that a new angle base 2 is created whose node (interpolation) correspond to the top dead center (OT) of the respective cylinder (and not the signal flanks of the trigger wheel) by a multiple of 0.5 degrees, for example. In FIG. 2b, the values G marked with [–] are time values corresponding to said angle base 2, whereby at first only one value is calculated per tooth flank interval. FIG. 3 shows the computation of the (n+1)-fold value of G with the aid of the known time values F and the corresponding angles L of the trigger wheel before (n-fold value) and after ((n+1)-fold value) under consideration of the angle correction value M.

The angle correction value firstly includes as parameter the predetermined offset angle of the tooth gap to the top dead center (OT) and the angle mounting error. Secondly, an rpm-dependent offset-angle correction is taken in consideration, which includes the transfer distance from the trigger wheel—crankshaft sensor—evaluation switching unit—interrupt data time etc. This value is determined in this application in the engine trailing throttle state of the engine from the symmetric pressure curve—through evaluation of the angle at maximum pressure, which is commonly about a 0.7 degree crank angle (KW)—whereby this value can be determined from an engine-specific, rpm-dependent characteristic on a test bench and be made available to the evaluation unit whereby said value lies before the true top dead center (OT). The method known from the engine-indexing technology is used for this purpose, e.g. the intersection method. Moreover, this correction value may also take into consideration an angle-dependent correction (function of tooth number), which includes manufacturing-dependent variances of the tooth-flank space in a trigger wheel. It must be especially pointed out that the angle correction value is calculated online and considered with its arbitrary discrimination—and not a multiple of the smallest angle increment.

To obtain several measuring values per tooth flank interval—e.g. 12 values with a discrimination of 0.5 degrees at a tooth flank interval of 6 degrees—the time values I, which are also marked with [+] in FIG. 2c, are computed through interpolation by means of the time value G. The thereby developing angle error is solely caused by the rpm-fluctuation of the trigger wheel in the corresponding tooth-flank interval. In FIG. 2c, there are illustrated the neighboring time values H and K of signal A, which are needed for signal interpolation and which are along the x-axis at a crank angle in degrees at all 0.5 degrees in addition to the time values I. The values H and K are elements of the time elements E illustrated in FIG. 2b.

Figure 4:
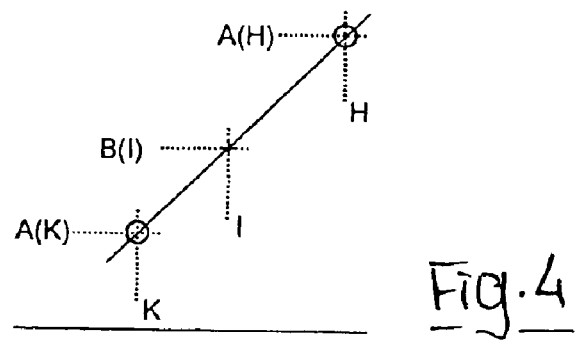

The signal value B, corresponding to the time values I, is computed by interpolation of the two neighboring values of signal A to the time value K and H (see FIG. 4)—A(K) is the signal value of A up to the sampling instant K—A(H) is the signal value of A up to the sampling instant H. The cursor D in FIG. 2c shows the value of I at 9 degrees crank angle. The corresponding time value is marked by the cursor C, which shows the corresponding values of A and G in FIGS. 2a and 2b.

A further description of determination of the angle-equidistant signal pattern is shown in the following statement (again in reference to FIG. 2 through FIG. 4): A continuous signal, e.g., the pressure signal p, is scanned at the sampling instants t1 (values H and K) and it results in the signal p1 (values A in FIG. 2a). In addition, the angle β, which is defined by the signal flanks of the rpm-sensor (7), is measured at the sampling instants t2 (values F in FIG. 2b)—it is incremented by 6 degrees at each flank, and reset to 0 at each second gap (in the range 0 to 708 degrees crank angle). Thus, there are the two discrete measurement series:

$$p1=p(t1), \beta2=\beta(t2).$$

In addition, there is an assignment rule for the true crankshaft angle α and the angle β, which is defined by the mounting angle and the rpm-dependent and angle-dependent characteristics: α=function (β, rpm). There is always a corresponding angle α2 at the sampling instants t2, and the following is true: α2=α(t2) . . . angle α at the sampling instants t2. Furthermore, there are discrete angle values α3 that may be predetermined by the user, which have a defined position relative to the top dead center (OT) of the engine (e.g. all 0.5° crank angles: 0.0°, 0.5°, 1.0°. . . 719.5°) at which places the value of p should be determined. Thus, determined should be p3=p(α3). The determination occurs in three steps:

1. Determination of α2 from α=function (β, rpm).
2. Determination of time values t3—corresponding to the values I in FIG. 2—at the corresponding angles α3 through interpolation of the time values t2.
3. Determination of p3=p(t3) . . . values of p at the sampling instants t3 through interpolation of the measuring values p1. Then the following is true: p(t3)=p(α3)

We claim:

1. A method for the establishment of working characteristics relevant to the operation of an internal combustion engine installable in a vehicle, said working characteristics being a signal pattern based on a crank angle representing combustion chamber pressure, wherein the working characteristic is time-based with high sampling frequency and is transformed to a crank angle basis with aid of angle time and angle-based crank-angle signals of low angle resolution under interpolation, and whereby there is assigned to the top dead center (OT) of a respective cylinder, by a multiple, a freely selectable angle increment under interpolation with high angle resolution.

2. A method according to claim 1, wherein the transformation is performed based on the crank angle under consideration of rpm- and/or angle-dependent correction values.

3. A method according to claim 2, wherein the correction values are obtained under defined load conditions without rpm-fluctuations caused by the operation in an engine trailing throttle state under the use of symmetric pressure pattern during engine trailing throttle state at open throttle, whereby the angle of the maximum cylinder pressure, detected by intersection method, to the top center (OT) of the engine has a rpm-dependent offset value, which is used for correction.

4. A method according to claim 1, wherein a cylinder pressure curve in the range up to the start of combustion of the respective cylinder, determined by thermodynamic calculation methods, is compared to an actual cylinder pressure curve, which is determined in turn by means of a pressure sensor, whereby the respective absolute crankshaft angle is computed with a discrimination in the range of an approximately 1° crank angle (KW).

5. A method according to claim 1, wherein interpolation is performed in a linear manner through implemented functions.

6. A method according to claim 1, whereby the time-based detection of the working characteristic occurs through discrimination, dependent on its dynamics, in the range of approximately 10 to 50 microseconds.

7. A method according to claim 1, wherein the time-based crank-angle signal is picked up on a (toothed) trigger wheel on the crankshaft having 60 minus 2 teeth.

8. A method according to claim 7, wherein mounting errors of the trigger wheel and sensor can be continuously corrected during operation when transformation and interpolation of the time-based, recorded working characteristic into a crank angle basis is done.

9. A device for establishment of working characteristics relevant to the operation of an internal combustion engine installable in a vehicle, said device comprising: a timely and highly discriminating working characteristic sensor for the relevant working characteristic, a crank angle sensor of low angle resolution (standard crank angle sensor) and being a toothed trigger wheel on a crankshaft having 60 minus 2 teeth together with a respective pick-up sensor, and a transformation and interpolation element being in communication with the highly discriminating working characteristic sensor and said crank angle sensor, whereby said transformation- and interpolation element establishes a highly discriminating signal pattern of the working characteristic or its output.

10. A device according to claim 9, wherein the transformation element and/or interpolation element is integrated in an engine control of the internal combustion engine.

11. A device according to claim 9, wherein the transformation element and/or interpolation element is integrated in a micro-electric unit, which is housed in one of a measuring amplifier, in a connector, and in a sensor itself.

* * * * *